United States Patent [19]

Tobolsky, deceased

[11] 3,865,898
[45] Feb. 11, 1975

[54] PROCESS FOR PREPARING BLOCK COPOLYMERS WITH CARBAMATE LINKAGES BETWEEN A POLYVINYL CHAIN AND A POLYMER HAVING ACTIVE HYDROGENS

[76] Inventor: Arthur V. Tobolsky, deceased, late of 191 Snowden Ln., Princeton, N.J. 08540 by Dorothy E. Tobolsky, executrix

[22] Filed: Feb. 26, 1973

[21] Appl. No.: 335,560

[52] U.S. Cl. ... 260/859 R, 260/75 NA, 260/75 NK, 260/77.5 CR
[51] Int. Cl............................................ C08g 41/04
[58] Field of Search .................................... 260/859

[56] References Cited
UNITED STATES PATENTS

| 3,257,476 | 6/1966 | Tobolsky | 260/859 |
| 3,291,859 | 12/1966 | Tobolsky | 260/859 |

Primary Examiner—Paul Lieberman
Attorney, Agent, or Firm—Bessie A. Lepper

[57] ABSTRACT

Method for forming block copolymers by reacting a polymer constituent with bis(4-isocyanatocyclohexyl)methane and then reacting the resulting isocyanate-capped prepolymer with a dihydroperoxide to form a peroxycarbamate which is used to initiate the polymerization of an ethylenically-unsaturated monomer. The resulting block copolymers can be formed as transparent films.

28 Claims, No Drawings

PROCESS FOR PREPARING BLOCK COPOLYMERS WITH CARBAMATE LINKAGES BETWEEN A POLYVINYL CHAIN AND A POLYMER HAVING ACTIVE HYDROGENS

This invention relates to block copolymers, their composition and processes for their preparation; and more particularly to block copolymers having an A—B—A—B structure.

In block copolymers the polymeric chains contain alternating blocks of homopolymers or of copolymers and each block differs from its adjacent block. When the two types of blocks have different properties, it is possible to form block copolymers which exhibit a combination of properties not attainable in homopolymers or copolymers alone. The block copolymers of this invention, wherein the blocks are alternately polymerized ethylenically-unsaturated monomers and polyurethanes, exhibit high impact strength, controllable modulus and a degree of elasticity. Such block copolymers are particularly suited for many different types of coatings, for castings, moldings, fibers and filaments.

In U.S. Pat. Nos. 3,257,476 and 3,291,859 there are disclosed unique block copolymers and processes for forming them. In U.S. Pat. No. 3,257,476 the block copolymers are of an A—B—A structure while those formed by the process disclosed in U.S. Pat. No. 3,291,859 are of the more desirable A—B—A—B structure. These two patents teach a novel synthesis route to the preparation of block copolymers wherein one block is a vinyl polymer and the other block can generally be referred to as a polyurethane. In the general scheme of synthesis as taught by these patents, a prepolymer is formed by reacting an aromatic diisocyanate with a polymeric material having functional groups with active hydrogens to form an "isocyanate-capped" prepolymer. The prepolymer is then usually reacted with tert-butyl hydroperoxide, a cumene hydroperoxide, or a dual-functional free radical initiator to form a peroxycarbamate which has reactive sites capable of initiating the polymerization of ethylenically-unsaturated monomers to form a block copolymer.

In preparing the block copolymers according to the teachings in these two earlier patents it was found that the peroxycarbamates were difficult to isolate in pure form and were generally yellow or brown due to small amounts of oxidation reactions. This in turn limited the polymerization of the monomers to bulk-type polymerizations wherein the monomers served as a solvent for the system. Moreover, although the block copolymers formed by these prior art methods exhibited satisfactory impact strength for many different uses, it would be desirable to have a method of forming block copolymers of this nature in which the impact strength and modulus can be varied and controlled. The block copolymers formed by the methods of U.S. Pat. Nos. 3,257,476 and 3,291,859 contain an appreciable quantity of vinyl homopolymer, a fact which can detract from the use of the block copolymers in some specific applications such as in transparent moldings and castings. Finally, the aromatic diisocyanates are toxic to work with and require care in handling.

It would therefore be desirable to have available a method for preparing block copolymers of the general character described in U.S. Pat. Nos. 3,257,476 and 3,291,859 which possess unique physical and chemical properties and which make possible the extension of the use of such block copolymers into additional fields of use because of improved, variable and controllable physical properties.

It is therefore a primary object of this invention to provide an improved method for the preparation of a unique class of block copolymers formed of alternating polyurethane and polyvinyl blocks. It is another object to provide a method of the character described which results in the formation of a colorless or transparent block copolymer, the impact strength and modulus of which may be varied and controlled within predeterminable limits. Still another object is to provide a method which permits isolation and purification of intermediates and which is not limited to bulk polymerization of the vinyl monomers. Yet another object is to provide such a method which gives rise to a block copolymer having a markedly reduced proportion of homopolymer content. An additional object of this invention is to provide a method of the character described which employs a specific form of diisocyanate which offers the possibility of reducing the toxic hazards of synthesis.

Another primary object of this invention is to provide a unique block copolymer which is colorless or transparent and which possesses controlled impact strength and modulus. Still another object is to prepare a block copolymer of the character described which has a low homopolymer content. Other objects of the invention will in part be obvious and will in part be apparent hereinafter.

The unique block copolymers of this invention are achieved through the use of an aliphatic diisocyanate, namely bis(4-isocyanatocyclohexyl)methane, to form the isocyanate-capped prepolymer in conjunction with the use a dihydroperoxide, preferably 2,5-dimethyl-2,5-bis(hydroperoxy)hexane, to form the intermediate peroxycarbamate with reactive sites capable of polymerizing ethylenically-unsaturated monomers.

Although it is preferable to use the 2,5-dimethyl-2,5-bix(hydroperoxy)hexane of the formula

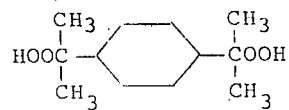

it is also possible to use the aromatic analog p-diisopropylbenzene-bis(hydroperoxide of the structure

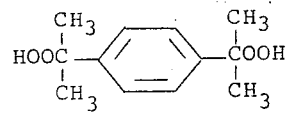

as the dihydroperoxide component. Thus this component may be defined more generally as a dihydroperoxide of the structure

where R is

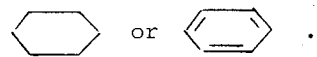

The use of the combination of the specific diisocyanate with the dihydroperoxide gives rise to a colorless block copolymer which may be transparent in relatively large thicknesses when the prepolymer and vinyl polymer components are chosen to have essentially the same index of refraction. Through control of reaction conditions and component ratios it is possible to vary and control physical properties of the block copolymers and to minimize the homopolymer content of the block copolymers. Chain extenders for the prepolymer may be added and the method may be carried out as a single-step or multiple-step process.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

Although, as noted above, the method of this invention may be carried out as a one-step or multiple-step process, it is convenient in describing it in detail and in defining the various reactants and constituents to set forth the method in separate distinct steps based on the order in which the reactions take place.

In the first step, a polymeric constituent is reacted with the diisocyanate to form what for convenience is referred to herein as a "diisocyanate-capped" prepolymer. The polymeric constituent may be any polymeric material having functional groups with active hydrogens (positive Zerewitinoff test), the active hydrogens being present in such terminal groupings as hydroxyls, carboxyls, amines and mercaptans. Among the polymeric contituents suitable for the practice of this invention are polyesters, polyethers, polypropylene glycols and polyethylene glycol. Polyesters of adipic acid, such as ethylene-propylene adipate and butylene adipate, are suitable polymeric constituents. Likewise, the polyesters of succinic and azelaic acids may also be used.

Among some of the preferred polymeric constituents are polyethylene glycols having molecular weights ranging from about 1,000 to about 4,000 and sold by Union Carbide Corporation under the Registered Trademark "Carbowax."

The diisocyanate used is a cycloalkyl-substituted diisocyanate designated as bis (4-isocyanatocyclohexyl)methane and having the structure

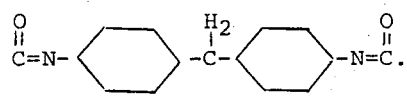

In a stepwise description of the method of this invention the first step is the reaction of the polymer constituent with the diisocyanate. Using a polyethylene glycol as the polymer constituent, this reaction may be represented as

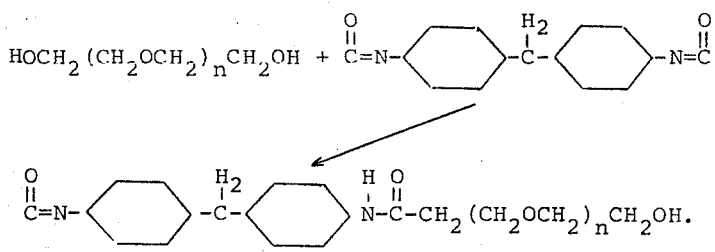

In the second step, this diisocyanate-capped prepolymer is reacted with 2,5-dimethyl-2,5-bis(hydroperoxy)hexane $$\text{HOOC-}\overset{CH_3}{\underset{CH_3}{|}}\text{-}\bigcirc\text{-}\overset{CH_3}{\underset{CH_3}{|}}\text{-OOH}$$

to form a bis (2,5-dimethyl-2-dihydroperoxyhexane-5-peroxycarbamate) polyether

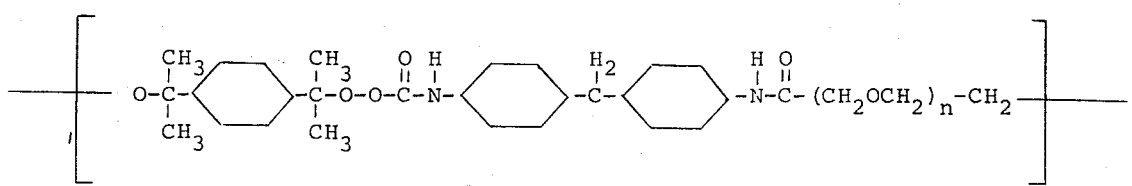

which is the peroxycarbamate.

If chain extension of the polyether polymer constituent is effected either through the choice of reaction conditions or by addition of a suitable chain extender, then the block copolymer precursor in the form of a peroxycarbamate may be represented as

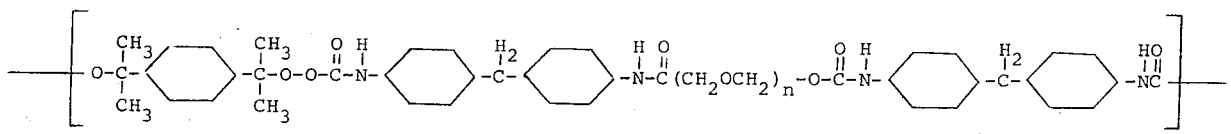

Finally, the third step is the addition of an ethylenically-unsaturated monomer, the active sites in the peroxycarbamate serving to the initiate the free radical polymerization of the monomer.

The monomers which are suitable for polymerization as one block of the block copolymers include the polymerizable diene and vinyl monomers. Exemplary of such monomers are vinyl monomers such as vinyl chloride, vinyl acetate, vinyl alcohol, styrene, methylvinyl ketone, vinylidene chloride, etc,; acrylic acid, and the acrylic esters such as methyl and ethyl acrylates; methacrylic acid and methacrylic esters such as methyl methacrylate, hydroxymethyl methacrylate, hydroxyethyl methacrylate, chloroacrylic esters and methacrylic esters; acrylonitrile, methacrylonitrile, and dienes such as butadiene, isoprene and chloroprene. The terms "polyvinyl" and "polyvinyl polymers" are used herein to refer to polymers formed by the polymerization of these ethylenically-unsaturated monomers. The polyvinyl portion of the novel block copolymers of this invention may be of a homopolymeric or copolymeric nature, the latter type being copolymerized from two or more ethylenically-unsaturated monomers.

Polymerization catalysts such as dibutyl tin dilaurate, stannous octoate, tertiary amines and the like are used in the polymerization of the monomer and formation of the final block copolymer.

The method and products of this invention are further described in the following examples which are meant to be illustrative and not limiting.

EXAMPLE 1

One hundred grams of ethylene-propylene adipate polyester (hydroxyl number 60) was reacted with 128 grams of bis-(4-isocyanatocyclohexyl)methane under a nitrogen blanket for 72 hours at 80°C. The reaction mixture was a white waxy solid at room temperature. Unreacted bis-(4-isocyanatocyclohexyl)methane was removed by refluxing the precipitate with six successive portions of dry petroleum ether. The resulting diisocyanate-capped polyester prepolymer was soluble in all proportions in methyl methacrylate which was used as the ethylenically-unsaturated monomer.

Commercial grade 2.5-dimethyl-2,5-bis(hydroperoxy) hexane was vacuum dried for use as the dihydroperoxy component and butane diol was used as a chain extender for the ethylenepropylene adipate polyester.

The polyester prepolymer which was made was used in formulating five different block copolymers, the weights of the components for which are tabulated in Table 1. In formulating the copolymers the components were weighed out, mixed and degassed at 50°C, the reaction mixture forming a solution in which the methyl methacrylate served as the solvent. The dibutyl tin dilaurate, used as a catalyst, was added last and the various reaction solutions were placed in glass molds. Chain extension was first carried out at 50°C and then polymerization of the methyl methacrylate was effected at 60°, 80° and 100°C steps according to the heating schedule of Table 2. All reactions were carried out under a nitrogen atmosphere.

Examples 1a, 1b and 1c had peroxygen contents of 0.03, 0.05 and 0.03% respectively; while polymethyl metacrylate and peroxygen content of 0.03.

Table 2

| | Heating Cycles | | | |
|---|---|---|---|---|
| Example No. | (time in hours) Temperature in °C | | | |
| | 50 | 60 | 80 | 100 |
| 2a | 14 | 24 | 6 | 2 |
| 2b | 17 | 19 | 6 | 2 |
| 2c | 17 | 19 | 6 | 2 |
| 2d | 18 | 25 | 6 | 2 |
| 2e | 17 | 19 | 6 | 2 |

The block copolymers formed had good mechanical properties. Evidence of this was the fact that Examples 1b and 1c had a 25°C modulus of 100,000 psi and 75,000 psi, respectively and an Izod impact strength of >2.0 and >20.0 ft lb/in., respectively. The comparable figures for polymethyl methacrylate are 450,000 psi and 0.4 lb/in.

The copolymers of Examples 1a–1e were in the form of small sheets of material about 1/16 inches thick. In this form they were transparent, essentially colorless and flexible to the extent that they could be bent. The freedom from any undesirable yellow or brown color was due to the use of an aliphatic isocyanate; while the transparency was due to the fact that the refractive indices of the polyurethane blocks and of the polymethyl methacrylate blocks were well matched.

Butylene adipate polyester may be substituted for the ethylene-propylene adipate polyester to obtain block copolymers having similar physical properties.

EXAMPLE 2

A mixture of 7.50 mmole of dry polyethylene glycol having a molecular weight of 4000 (sold by Union Carbide Corporation under the tradename of Carbowax-4000) and 37.50 mmole of bis(4-isocyanatocyclohexyl)methane was allowed to react undisturbed under nitrogen for 47 hours at 80°C. After cooling, the mixture was dissolved in 250 ml dry toluene and precipitated twice in dry petroleum ether. Recovery of the product isocyanatecapped polyester prepolymer, following overnight drying under vaccum, was 98 percent. The molecular weight of the prepolymer was determined by end group analysis to be 5,180, indicating that only a very slight chain extension had occurred. Exactly 5.00 mmole of the prepolymer and an equivalent molar amount of 2,5-dimethyl-2,5-bis(hydroperoxy) hexane were dissolved in sufficient dimethyl formamide to make a 20 percent solids solution to which dibutyl tin dilaurate was added in an Table 1

| | | | Reaction Components | | | | | |
|---|---|---|---|---|---|---|---|---|
| Example No. | (PEP) Polyester Prepolymer | (MMA) Methyl Methacrylate | PEP / MMA | (DHP) Dihydro- Peroxide | % DHP on MMA | Butane Diol | —NC=O Active H₂ | Catalyst Moles/l of Solution |
| 1b | 5.347 | 16.05 | 25/75 | 0.0314 | 0.196 | 0.1288 | 0.970 | 0.00326 |
| 1c | 10.73 | 10.73 | 50/50 | 0.0208 | 0.194 | 0.2587 | 1.000 | 0.00326 |
| 1d | 25.73 | 25.74 | 50/50 | 0.0508 | 0.197 | 0.6317 | 0.985 | 0.00326 |
| 1e | 16.04 | 5.354 | 75/25 | 0.0100 | 0.187 | 0.4014 | 0.995 | 0.00326 |

*Weight in grams amount equivalent to 0.2 percent by weight of the total weight of prepolymer and dihydroperoxide. After 70 hours at room temperature under a nitrogen atmosphere, the product was precipitated in petroleum ether and then vacuum dried. Ten parts by weight of this product, 81 parts by weight of hydroxethyl methyl methacrylate and 9 parts by weight of methacrylic acid were dissolved in sufficient methyl ethyl ketone to form a solution having a 20 percent solids concentration. This solution was refluxed with agitation under a nitrogen atmosphere at 80°C for 6 hours. The resulting block copolymer was then cooled and precipitated in petroleum ether and dried. It had a peroxygen content of 0.13 percent. When ten grams of this product was mixed with an excess of 2-propanol, less than 0.5 grams were extracted, indicating that less than 5 weight percent of the product block copolymer was a vinyl copolymer. The remaining product which was not extractable with 2-propanol was soluble in dimethyl formamide, indicating it to be the desired block copolymer.

In contrast to the formation of a true block copolymer as was accomplished in this example, when the product of the reaction between prepolymer and dihydroperoxide was replaced by an equivalent peroxygen value of benzoyl peroxide in the polymerization of hydroxyethyl methyl methacrylate and methacrylic acid, all of the resulting dry polymer was soluble in 2-propanol. This product was therefore a vinyl copolymer.

EXAMPLE 3

This example illustrates the preparation of three different peroxycarbamates which were suitable for polymerization of ethylenically-unsaturated monomers to form block copolymers.

Twenty-five mmole of dry polyethylene glycol (molecular weight 1000) was allowed to react with 50 mmole of bis (4-isocyanatocyclohexyl)methane for 72 hours at 80°C under a nitrogen blanket. The reaction mixture was a colorless liquid at 80°C and a white waxy solid at room temperature. Unreacted diisocyanate was removed by refluxing the precipitate with six successive portions of dry petroleum ether. Then 25 mmole of this prepolymer and 50 mmole of 2,5-dimethyl-2,5-bis(hydroperoxy) hexane were dissolved in 100 ml of dry methyl chloride and 0.040 gram of dibutyl tin dilaurate was added as a catalyst. This reaction solution was allowed to stand at room temperature for 45 hours, then diluted and precipitated in 1 liter of dry petroleum ether. The solution was decanted and a fresh liter of petroleum ether containing 25 ml of methylene chloride was added to the precipitate. After two washings with petroleum ether, the precipitate was filtered, vacuum dried overnight and analyzed for peroxygen content by iodine thiosulfate titration. The peroxygen content was found to be 2.71 weight % as compared with a calculated 3.40 percent if no chain extension had taken place.

The same procedure was repeated using twice as much of the diisocyanate to give an isocyanate-capped polyethylene glycol prepolymer having a molecular weight (determined by end group analysis) of 2,530 indicating that chain extension had occurred. Ten grams of this prepolymer along with 10 grams of 2,5-dimethyl-2,5-bis(hydroperoxy) hexane were dissolved in 100 ml of dry benzene to which 0.200 gram of dibutyl tin dilaurate had been added. The mixture was stirred at room temperature under nitrogen for 48 hours. After precipitation several times in petroleum ether and vacuum drying, the resulting peroxycarbamate was determined to have a peroxygen content of 2.11 weight percent.

A mixture of 7.50 mmole of dry polyethylene glycol having a molecular weight of 4,000 and 37.50 mmole of bis (4-iso-cyanatocyclohexyl)methane was allowed to react undisturbed under nitrogen for 47 hours at 80°C. After cooling, the mixture was dissolved in 250 ml of dry toluene and precipitated twice in dry petroleum ether. Recovery of the prepolymer was 98 percent of theoretical after drying overnight under vacuum. A molecular weight of 5,180 was obtained by end group analysis, revealing that only a slight extension of the chain had occurred. Exactly 5.00 mmole of this prepolymer and an equivalent molecular weight of 2,5-dimethyl-2,5-bis(hydroperoxy) hexane were dissolved in 200 ml of dry toluene to which 0.020 gram of dibutyl tin dilaurate had been added. After two days at room temperature, the product was precipitated in petroleum ether and vacuum dried. The block copolymer precursor thus formed was a white powder with a peroxygen content of 1.09 weight percent. It was recovered in better than 98 percent yield. The average molecular weight of this precursor material was calculated to be $5.05 \times 10^4$ from intrinsic viscosities in benzene and toluene at 25°C.

The three block copolymer precursors thus formed were suitable for initiating the polymerization of ethylenically-unsaturated monomers to form block copolymers. In those cases where the precursor is soluble in the monomer, bulk polymerization could be carried out; or solution polymerization could be effected in all cases.

Since the physical properties of the block copolymer are at least partially due to the ratio of one block constituent (e.g., the prepolymer) to the other block constituent (e.g., the vinyl polymer) it is convenient to have a method which provides for the varying and control of this ratio. This is done in the method of this invention by controlling the length of the polyester or polyether segments. The length of the polyester or polyether segments may be increased by using chain extenders such as butane diol, ethylene diamine, methylene dianiline and the like. The use of such chain extenders permits the incorporation of more prepolymer into the block copolymer without unduly building up an excess peroxide concentration which can lead to the formation of undesirable homopolymers and to unwanted crosslinking.

The steps of the method of this invention are carried out under nonoxidizing conditions, e.g., in nitrogen atmosphere. The reaction of the diisocyanate with the polymer constituent is preferably carried out at elevated temperatures, i.e., between about 50° and about 80°C for a time sufficient to complete the reaction as evidenced by removal of diisocyanate from the reaction system. The reaction time may vary from a few hours to several days, depending upon the temperature and upon the reactants. If the reactants are not mutually soluble, then an inert organic solvent may be used as a reaction medium. Exemplary of such a solvent is methyl ethyl ketone.

In reacting the diisocyanate-capped prepolymer with the dihydroperoxide, temperatures from ambient up to about 50°C and reaction times from a few hours to several days may be used. It will generally be preferable to carry out this step in an inert organic solvent such as methyl ethyl ketone, dimethyl formamide, methyl chloride and the like.

Polymerization of the ethylentically unsaturated monomer with the peroxycarbamate is carried out at elevated temperatures, for example between about 60° and about 100°C until polymerization is complete. If the monomer is a liquid and the peroxycarbamate is soluble in it, then it may be bulk polymerized. If bulk polymerization is not feasible or desired, then a solvent such as ethylene glycol monoethyl ether, methyl ethyl ketone and the like may be used for solvent polymerization. In like manner a nonsolvent medium may be used for emulsion or dispersion polymerization.

If the steps are carried out, as in Example 1, without the isolation of any intermediate product, then the temperatures are varied within the specified ranges as each additional reactant is added to the reaction system. If all reactants are added in the beginning, then a lower temperature is maintained until the peroxycarbamate is formed, at which time the temperature is increased to effect the polymerization of the ethylenically-unsaturated monomer.

In the preparation of the block copolymers of this invention by the method described, it is preferable in obtaining desired physical properties in the copolymers to maintain the relative amounts of reactants within certain specified ranges. These may be defined as follows.

The equivalent mole ratio of the bis(4-isocyanatocyclohexyl)methane to —OH and —O—OH introduced in the combination of polymer constituent (e.g., polyester or polyether), 2,5-dimethyl-2,5-bis (hydroperoxy) hexane and chain extender if used should be about one to one. The molar ratio of the dihydroperoxide plus any chain extender which may be used to the prepolymer is preferably between 0.8 and 1.2 with the peroxygen content of the peroxycarbamate ranging between about 0.01 percent and 1 percent by weight. If a chain extender is used, the mole ratio of chain extender to the dihydroperoxide may be up to about 10.

A wide range of weight ratios of prepolymer to monomer may be employed to obtain a wide range of physical properties in the block copolymer. Thus this weight ratio may vary between about 5/95 to about 90/10. In the polymerization of the ethylenically-unsaturated monomer, the percent of dihydroperoxide on the monomer may range from about 0.01 to about 5 percent by weight. Finally, the amount of polymerization catalyst may amount to between about $10^{-4}$ to $10^{-2}$ moles per liter of the polymerization solution or dispersion.

The method of this invention provides a unique block copolymer wherein the blocks or alternately polyurethanes and polyvinyls. If the blocks have substantially the same refractive index, the block copolymer may be made in transparent form. By varying the ratio of polyurethane to polyvinyl it is possible to vary the impact strength and modulus of the copolymer. In general the larger the ratio of polyurethane to polyvinyl, the greater will be the toughness and elasticity of the block copolymers; and the smaller the ratio the greater will be the impact strength.

It will thus be seen that the objects set forth above, among those made apparent from the preceding description, are efficiently attained, and, since certain changes may be made in carrying out the above method and in the composition set forth without departing from the scope of the invention, it is intended that all matter contained in the above description shall be interpreted as illustrative and not in a limiting sense.

I claim:

1. A method for preparing a block copolymer, comprising the steps of
   a. reacting a polymer constituent with bis(4-isocyanatocyclohexyl) methane at a temperature ranging between about 50° and about 80°C, thereby to form an isocyanate-capped prepolymer;
   b. reacting at a temperature up to about 50°C said isocyanate-capped prepolymer with a dihydroperoxide of the formula $HOOC(CH_3)_2—R—C(CH_2)_3OOH$ wherein R is

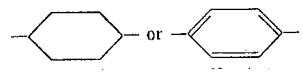

to form a peroxycarbamate having a peroxygen content ranging between about 0.01 and 1 percent by weight and being capable of initiating the polymerization of an ethylenically-unsaturated monomer, the mole ratio of said bis(4-isocyanatocycohexyl) methane to the —OH and —O—OH in said polymer constituent and said dihydroperoxide being about one to one;
   c. adding said peroxycarbamate to an ethylenically unsaturated monomer in a liquid medium, the weight ratio of said prepolymer in said peroxycarbamate to said monomer ranging between about 5 to 95 and about 90 to 10 and the amount of said bis(4-iso-cyanatocyclohexyl) methane on said monomer ranging between about 0.01 and about 5 percent by weight; and
   d. heating the mixture from step (c) at a temperature between about 60° and about 100°C for a time sufficient to polymerize said monomer and form a block polymer of alternating polyurethane and polyvinyl blocks.

2. A method in accordance with claim 1 wherein steps (a)–(d) are carried out in a nonoxidizing atmosphere.

3. A method in accordance with claim 2 wherein said nonoxidizing atmosphere is nitrogen.

4. A method in accordance with claim 1 wherein step (a) is carried out in an inert organic solvent.

5. A method in accordance with claim 1 wherein step (b) is carried out in an inert organic solvent.

6. A method in accordance with claim 1 wherein said dihydroperoxide is 2,5-dimethyl-2,5-bis(hydroperoxy)-hexane.

7. A method in accordance with claim 1 wherein said dihydroperoxide is p-diisopropylbenzene-bis(hydroperoxide).

8. A method in accordance with claim 1 wherein said ethylenically-unsaturated monomer is a solvent for said peroxycarbamate and serves as said liquid medium, whereby said polymerization of step (d) is carried out as a bulk polymerization.

9. A method in accordance with claim 1 wherein said polymerization of step (d) is carried out in an inert organic solvent serving as at least portion of said liquid medium.

10. A method in accordance with claim 1 wherein said polymerization of step (d) is carried out in an inert nonsolvent liquid serving as at least portion of said liquid medium.

11. A method in accordance with claim 1 wherein steps (a)–(d) are performed without isolating any of the intermediate compounds formed.

12. A method in accordance with claim 1 wherein said isocyanate-capped prepolymer is isolated and purified.

13. A method in accordance with claim 1 wherein said peroxycarbamate is isolated and purified.

14. A method in accordance with claim 1 including the further step of adding in step (c) a polymerization catalyst in a quantity ranging between about $10^{-4}$ and about $10^{-2}$ gram moles per liter of said liquid medium.

15. A method in accordance with claim 1 including the further step of adding a chain extender for said prepolymer in step (b), the molar ratio of said chain extender to said dihydroperoxide being up to 10.

16. A method in accordance with claim 15 wherein the molar ratio of dihydroperoxide plus chain extender to said prepolymer is between about 0.8 and 1.2.

17. A method in accordance with claim 1 wherein said polymer constituent is a polyethylene glycol ester.

18. A method in accordance with claim 1 wherein said polymer constituent is a polyethylene glycol ether.

19. A method in accordance with claim 1 wherein said polymer constituent is a polyester of adipic, succinic or azelaic acid.

20. A method in accordance with claim 19 wherein said polymer constituent is ethylene-propylene adipate polyester.

21. A method in accordance with claim 1 wherein said ethylenically-unsaturated monomer is a vinyl monomer.

22. A method in accordance with claim 21 wherein said vinyl monomer is styrene.

23. A method in accordance with claim 1 wherein said monomer is an acrylic ester.

24. A method in accordance with claim 1 wherein said monomer is a mixture of acrylic acid and an acrylic ester.

25. A method in accordance with claim 1 wherein said monomer is a methacrylate ester.

26. A method in accordance with claim 25 wherein said methacrylic ester is 2-hydroxyethyl methacrylate.

27. A method in accordance with claim 25 wherein said methacrylate ester is methyl methacrylate.

28. A method in accordance with claim 1 wherein said monomer is a mixture of a methacrylic ester and an acrylic or methacrylic acid.

* * * * *